United States Patent
Ida et al.

(10) Patent No.: US 6,948,606 B2
(45) Date of Patent: Sep. 27, 2005

(54) AUTOMATIC TRANSMISSION

(75) Inventors: Masahiro Ida, Anjo (JP); Nobukazu Ike, Anjo (JP); Satoru Kasuya, Anjo (JP); Masaaki Nishida, Anjo (JP); Masahiro Hayabuchi, Anjo (JP); Mitsutaka Okuno, Anjo (JP)

(73) Assignee: Aisin Aw Co., Ltd., Aichi-ken (JP)

( * ) Notice: Subject to any disclaimer, the term of this patent is extended or adjusted under 35 U.S.C. 154(b) by 0 days.

(21) Appl. No.: 10/623,503

(22) Filed: Jul. 22, 2003

(65) Prior Publication Data

US 2004/0065168 A1 Apr. 8, 2004

(30) Foreign Application Priority Data

Aug. 8, 2002 (JP) ........................................ 2002-231303

(51) Int. Cl.⁷ .......................... F16H 57/04; F16D 13/74; F16D 25/12
(52) U.S. Cl. ................. 192/85 AA; 74/467; 74/606 R; 184/6.27; 192/113.5
(58) Field of Search ...................... 192/85 AA, 113.1, 192/113.3, 113.5; 74/467, 606 R; 475/159; 184/6.12, 6.27

(56) References Cited

U.S. PATENT DOCUMENTS

| | | | | |
|---|---|---|---|---|
| 2,792,716 A | * | 5/1957 | Christenson | 192/85 AA |
| 4,715,780 A | * | 12/1987 | Kan | 415/200 |
| 4,982,826 A | * | 1/1991 | Holbrook | 192/85 AA |
| 5,267,840 A | * | 12/1993 | Snow et al. | 417/310 |
| 2001/0011616 A1 | * | 8/2001 | Kageyama et al. | 184/6.12 |
| 2004/0031352 A1 | * | 2/2004 | Okuno et al. | 74/606 R |

FOREIGN PATENT DOCUMENTS

| | | | |
|---|---|---|---|
| DE | 2 305 476 | * | 8/1974 |
| JP | 08-121567 A | | 5/1996 |

* cited by examiner

*Primary Examiner*—Rodney H. Bonck
(74) *Attorney, Agent, or Firm*—Sughrue Mion, PLLC

(57) ABSTRACT

A transmission has an oil drain passage for connecting an oil reservoir with a mission case in a pump casing. The automatic transmission has also a retainer serving as a shielding member to shield between a discharge opening of the oil drain passage from at least part of a multistage transmission mechanism. This ensures that breather oil blow, which is caused by the spattering and stirring of operating oil by the high-speed drum member, is shielded from at least part of the transmission mechanism.

12 Claims, 3 Drawing Sheets

AUTOMATIC TRANSMISSION

This application claims priority from Japanese Patent Application JP 2002-231303, which was filed on Aug. 8, 2002 and is incorporated herein by reference.

BACKGROUND OF THE INVENTION

1. Field of the Invention

The present invention relates to an automatic transmission, and more particularly, concerns an automatic transmission with improvements in draining oil for lubricating between a pump drive shaft for driving a pump unit and a bearing hole for supporting the drive shaft.

2. Description of the Related Art

For example, with an oil pump driven by the output rotation of an engine to supply an automatic transmission fluid (hereinafter, referred to as an ATF) to each component of an automatic transmission, the output rotation is transmitted through a sleeve-like pump drive shaft connected to a pump impeller of a torque inverter. The ATF (also referred to as oil or operating oil in the present specification) pumped from the oil pump is supplied for lubrication to a bearing member disposed between the pump drive shaft fitted in a bearing hole of a pump casing for housing the oil pump and the bearing hole, thereby preventing seizing-up and the like of the bearing member during high-velocity rotation.

The operating oil supplied in this way is stored in a fluid reservoir which is formed by sealing the opening end opposite to the bearing member in the bearing hole (adjacent to the torque converter) with an oil seal to lubricate a sliding plane between the bearing member and its surroundings. With such a structure, however, during the operation of the oil pump, the operating oil that is sequentially fed fills the fluid reservoir to increase the pressure, thereby sometimes causing oil leakage from the sealed portion with the oil seal into a converter housing.

Therefore, an oil pump structure has been proposed in which the oil leakage is improved by providing an oil drain passage capable of discharging (draining) the operating oil in the oil reservoir into a mission case to which the pump casing is joined, so that the operating oil can flow smoothly into an oil pan through the oil drain passage and the mission case, thereby restraining an increase in the pressure in the oil reservoir (for example, refer to JP-A-8-121567). The oil pump structure disclosed in the gazette is constructed such that part of the oil drain passage connecting the oil reservoir with the mission case is located higher than the center of the pump drive shaft to thereby prevent the lubricating oil in the oil reservoir from flowing out from the oil drain passage when the oil pump is not operated, thus preventing a shortage of lubricating oil on the sliding plane of the pump drive shaft when the oil pump is driven again.

With the above oil pump structure, however, the operating oil discharged through the oil drain passage into the mission case is spattered around a rotating drum that supports a brake and so on housed in the case, thus having the problem of causing breather oil blow such that the operating oil is stirred by the high speed drum to foam while generating oil drag. The breather oil blow occurs when a breather mechanism is provided for eliminating a difference in the pressure between the inside and the outside of the casing of the automatic transmission by exhausting an air therein to the exterior when the pressure in the casing has become higher than that of the exterior.

SUMMARY OF THE INVENTION

Accordingly, it is an object of the present invention to provide an automatic transmission constructed to prevent breather oil blow by preventing oil discharged from an oil drain passage into a mission case from being spattered toward part of the transmission mechanism According to at least one embodiment of the present invention, an automatic transmission is provided which includes a pump unit for applying hydraulic pressure; a transmission mechanism capable of outputting inputted rotation in variable speed; a pump casing for housing the pump unit and integrated with a mission case for housing the transmission mechanism; a pump drive shaft, rotatably fitted in a bearing hole, in the pump casing, wherein the pump drive shaft drives the pump unit; a bearing member disposed between the pump drive shaft and the bearing hole; a seal member disposed between the pump drive shaft and the bearing hole, wherein the sealing member seals the leakage of oil; and an oil reservoir provided between the seal member and the bearing member. The pump casing is provided with an oil drain passage connecting the oil reservoir with the mission case; and a shielding member is interposed between an opening of the oil drain passage to the mission case and at least part of the transmission mechanism to shield the at least part of the transmission member.

DESCRIPTION OF THE PREFERRED EMBODIMENTS

Figure 1:
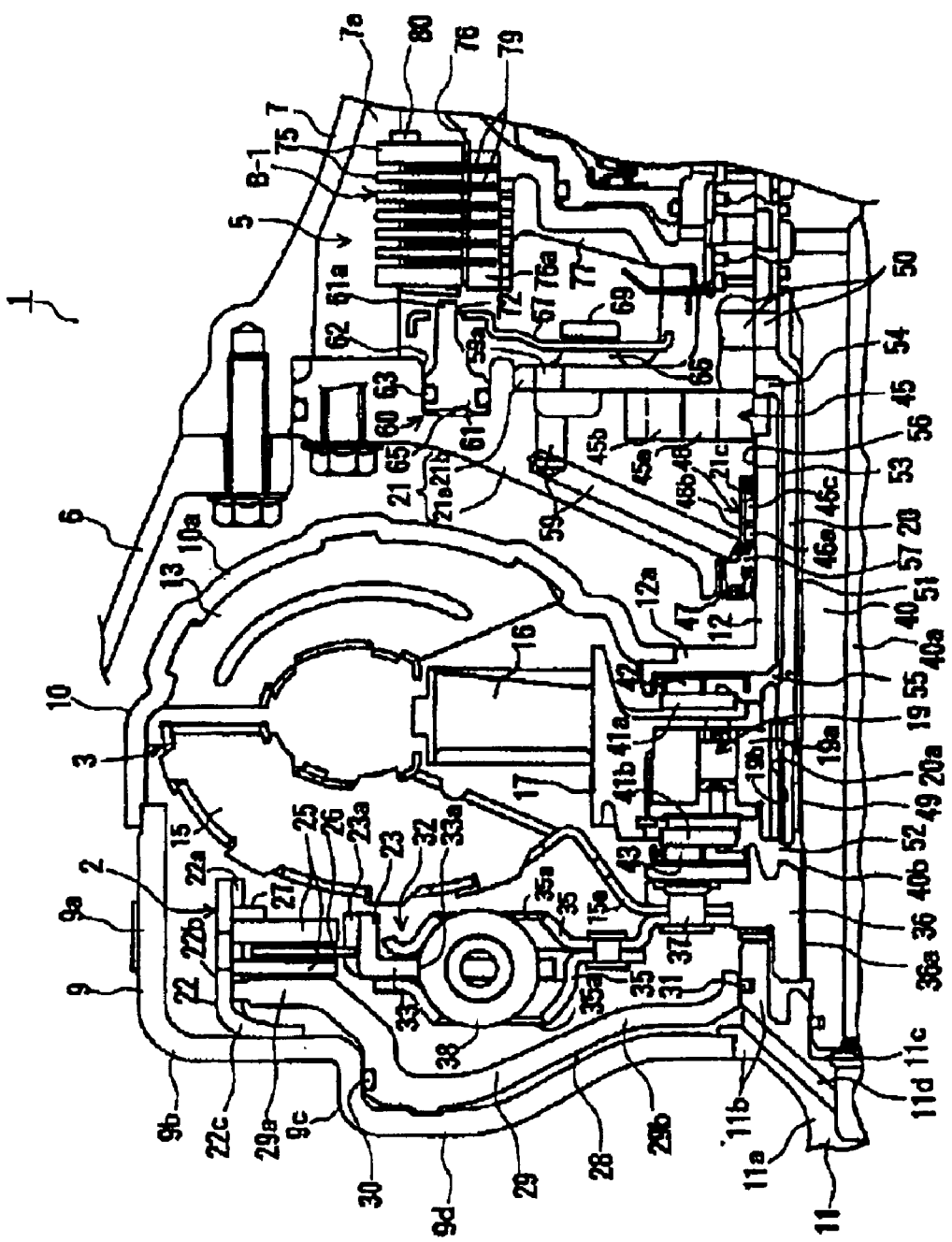
FIG. 1 is a partial sectional view, on an enlarged scale, of an automatic transmission according to an embodiment of the present invention.
Figure 2:
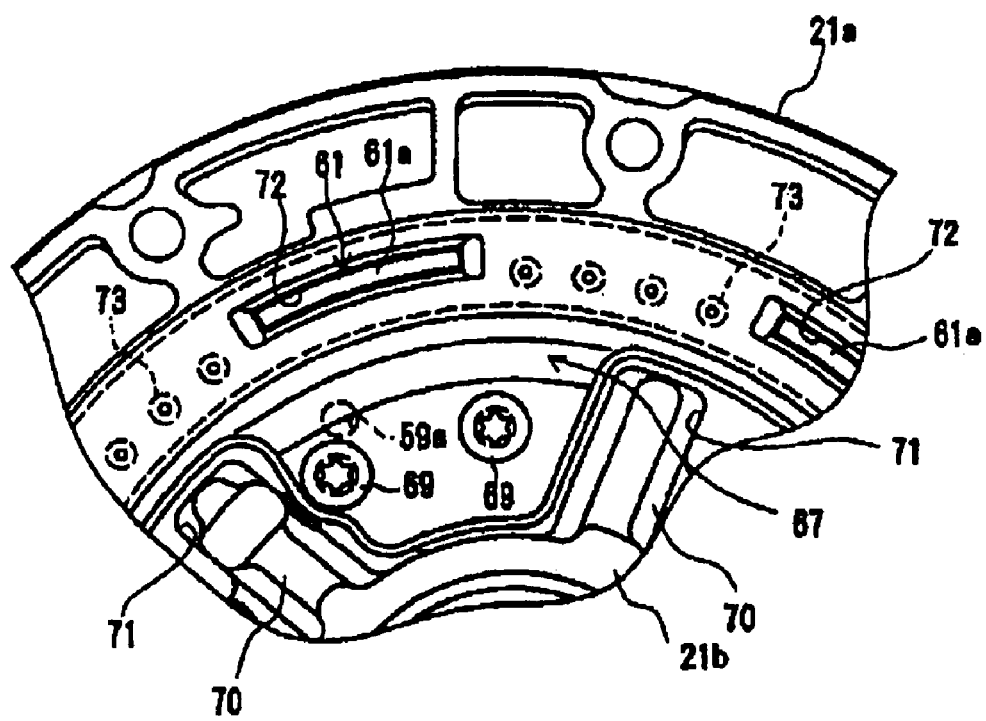
FIG. 2 is a side view of a hydraulic actuator disposed in a pump casing, seen from a brake B-1 in FIG. 1.
Figure 3:
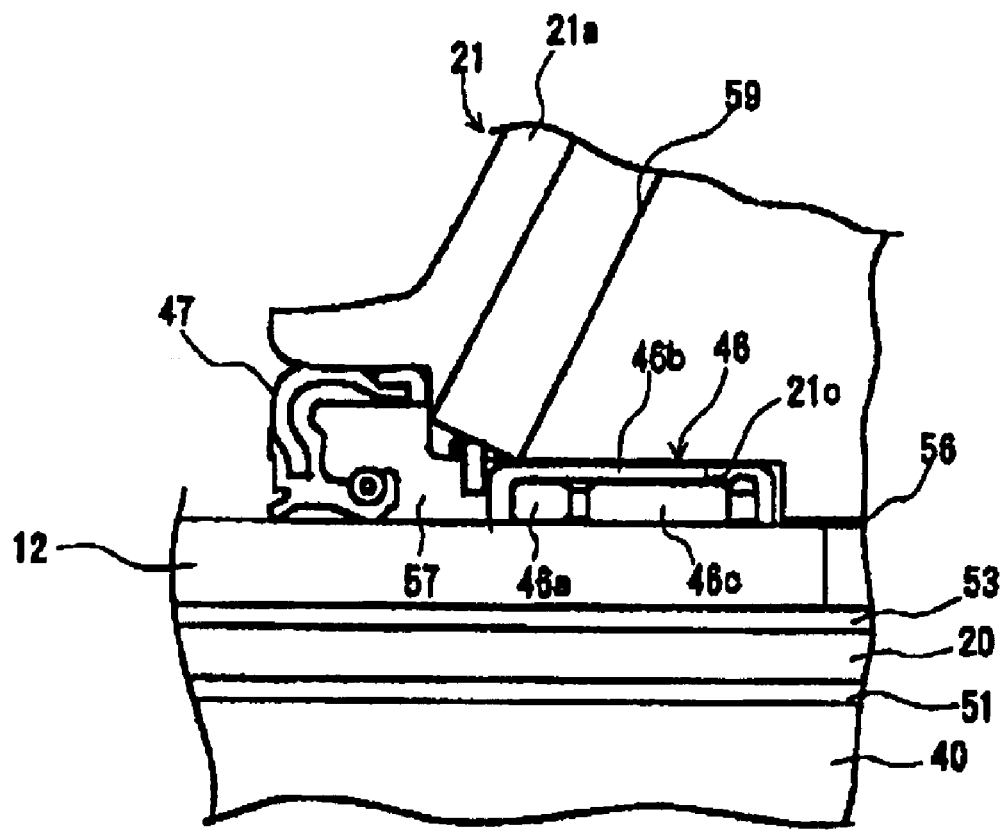
FIG. 3 is an enlarged sectional view of a roller bearing and so on disposed between a pump drive shaft and a bearing hole.

While the invention is open to various modifications and alternative forms, specific embodiments thereof are shown by way of examples in the drawings and are described herein in detail. There is no intent to limit the invention to the particular forms disclosed. FIG. 1 is a sectional view, on a partially enlarged scale, of an automatic transmission 1 according to an embodiment of the present invention; FIG. 2 is a side view of a hydraulic actuator 60 disposed in a pump casing 21, seen from a brake B-1 in FIG. 1; and FIG. 3 is an enlarged sectional view of a roller bearing 46 disposed between a pump drive shaft 12 and a bearing hole 21c. Referring to FIG. 1, the left of the automatic transmission 1 is connected to an internal-combustion engine (not shown) such as a gasoline engine.

Referring to FIG. 1, the automatic transmission 1 includes a lockup clutch 2, a torque converter 3, and a multistage transmission mechanism 5 to which a driving force (output rotation) from the internal-combustion engine is transmitted through the torque converter 3. The lockup clutch 2, the torque converter 3, and the multistage transmission mechanism 5 are arranged uniaxially in series and housed in an integral case of a converter housing 6 and a mission case 7.

The torque converter 3 is housed in the converter housing 6, and the converter housing 6 is connected to an engine block on the left and connected to the mission case 7 on the right. The torque converter 3 includes a front cover 9 and a rear cover 10 which are integrally connected together by welding to form an integral case; the front cover 9 is connected to an engine crankshaft. A center piece 11 is integrally fixed to the inner radius of the base end of the front cover 9 and includes a central projection 11a fitted in the recess of the engine crankshaft (not shown) for alignment, a thick ring-shaped boss 11b, and a recess 11c into which an input shaft 40 is fitted.

The rear cover 10 has an outer radius 10a that forms the outer hull of a pump impeller 13 and a sleeve-like pump drive shaft 12, which is integrally fixed to the inner radius end of the cover 10 by welding. The drive shaft 12 is rotated by the torque of an engine and drives an oil pump 45. The oil pump 45, which is driven by the power of the internal-combustion engine, applies hydraulic pressure to the operating oil. The oil pump 45 includes an inner gear 45a, which is fitted to the pump drive shaft 12 in a manner such that the inner gear 45a cannot rotate relative to the pump drive shaft 12, and an outer gear 45b, which houses the inner gear 45a on the inner periphery of the outer gear 45. A turbine runner 15, which has substantially the same shape as the pump impeller 13, is disposed opposite to the pump impeller 13 with a stator 16 placed between the turbine runner 15 and stator 16. The outer hulls of the pump impeller 13 and the turbine runner 15 form a torus that transmits power via the medium of operating oil. The stator 16 is connected to the mission case 7 through a support member 17, a one-way clutch 19, and a cover boss 20.

On the other hand, the front cover 9 includes an outer radius 9a extending substantially in parallel to the axis of the lockup clutch 2, torque converter 3, and the multistage transmission mechanism 5, a side 9b extending from the outer radius 9a substantially perpendicularly to the axis, an intermediate step 9c extending substantially in parallel to the axis, and a side 9d extending from the intermediate step 9c substantially perpendicularly to the axis. The lockup clutch 2 formed of a multiple disc clutch is housed inside the outer radius 9a.

The lockup clutch 2 includes a drum member 22, a hub member 23, two clutch plates 25, and a clutch disc 26. The outer radii of the two clutch plates 25 are in engagement with a spline 22a of the drum member 22, and the inner radius of the clutch disc 26 is in engagement with a spline 23a of the hub member 23. In the lockup clutch 2, the clutch plates 25 and the clutch disc 26 are arranged alternately, and a snap ring 27 mounted at the end of the drum member 22 prevents the clutch plates 25 from coming off.

The drum member 22 has a substantially U-shaped ring cross section. The spline 22a is on the inner radius of drum member 22, and an outer radius 22 of the drum member 22 extends parallel to the outer radius 9a of the front cover 9 at a predetermined distance apart from the outer radius 9a of the front cover 9. A side 22c of the drum member 22 extends perpendicular to the outer radius 22b and extends substantially parallel to the side 9b of the front cover 9. Part of the side 22c is secured to the side 9b of the front cover by welding. The intermediate step 9c of the front cover 9 forms a ring-shaped cylinder chamber 28 together with the partial inner surface of the side 9d and the outer surface of the boss 11b of the center piece 11. The center piece 11 has an oil passage 11d for applying a predetermined hydraulic pressure to the cylinder chamber 28.

A piston member 29 is fitted in the cylinder chamber 28. The piston member 29 bends around the intermediate step 9c toward the outer radius 9a, forming a pressure section 29a. The pressure section 29a is opposed to one end of the clutch plate 25 and operates the lockup clutch 2. The piston member 29 includes a ring-shaped piston member 29b projecting in an axial direction. The outer circumference of the ring-shaped piston member 29b has a recessed groove that houses an O-ring 30. A recessed groove for housing an O-ring 31 is formed in the outer circumference of the center-piece boss 11b. The piston member 29b is oil-tightly fitted to the inner circumference of the intermediate step 9c and the outer circumference of the center-piece boss 11b to construct the cylinder chamber 28 with part of the side 9d of the front cover 9 as a bottom wall.

The hub member 23 is formed by bending the outer radius end of a drive plate 33 of a damper 32 in an axial direction. The damper 32 includes the disc-shaped drive plate 33, two driven plates 35 integrally connected to the drive plate 33 so as to sandwich the drive plate 33, and a coil spring 38 acting as a vibration absorbing means. The coil spring 38 is received by a long hole 33a formed in the circumferential direction of the drive plate 33 and expanding sections 35a of the driven plates 35. The coil spring 38 is compressed by the relative rotation of the drive plate 33 and the driven plates 35 to absorb a steep torque change among the plates.

The driven plates 35 are integrally fixed to a turbine hub 36 at the base end with rivets 37. An inner radius 15a of the turbine runner 15 is also fixed to the turbine hub 36 with the common rivets 37. The turbine hub 36 is connected to the input shaft 40 by the engagement between a spline 36a on the inner surface of the turbine hub 36 and a spline 40b on the outer surface of the input shaft 40 so that the turbine hub 36 does not rotate relative to the input shaft 40. The input shaft 40 transmits the output rotation of an internal-combustion engine (not shown) and extends toward the multistage transmission mechanism 5.

The support member 17 includes thick races 41a and 41b. The one-way clutch 19 is sandwiched between the thick races 41a and 41b in an axial direction. A thrust bearing 42 is interposed between the thick race 41a and a flange 12a of the pump drive shaft 12. Another thrust bearing 43 is interposed between the thick race 41b and an inner radius 15a of the turbine runner 15. Therefore, the turbine hub 36, the driven plates 35 integrated with the turbine hub 36, and the turbine runner 15 are supported by the front cover 9 and the rear cover 10 through the thrust bearing 43 so that the turbine hub 36, the driven plates 35 integrated with the turbine hub 36, and the turbine runner 15 rotate freely together with the input shaft 40. The drive plate 33 and the hub member 23 sandwiched by the driven plates 35 and supported though the coil spring 38 are also supported by the front cover 9 and the rear cover 10 through the thrust bearing 43.

The pump casing 21 that houses the oil pump 45 is integrally connected to the converter housing 6 and the mission case 7. The pump casing 21 includes an oil-pump housing 21a that is directly fixed to the mission case 7 and an oil-pump cover 21b fixed to the housing 21a. The pump drive shaft 12 is rotatably fitted in the bearing hole 21c. The pump drive shaft 12 passes through the inner radius of the housing 21a and through a roller bearing 46. An oil seal 47 is interposed between the outer circumference of the pump drive shaft 12 and the inner circumference of the bearing hole 21c at the opening end of the bearing hole 21c. The position of the oil seal 47 is opposed to the position of the roller bearing 46 and is adjacent to the torque converter 3. The space between the oil seal 47 and the roller bearing 46 is oil-tightly sealed to form an oil reservoir 57.

Referring to FIG. 3, the roller bearing 46 for rotatably supporting the pump drive shaft 12 in the oil-pump housing 21a will be specifically described. The roller bearing 46 includes an outside ring (race member) 46b in contact with the inner circumference of the bearing hole 21c, a roller 46c housed in the outside ring 46*b* such that it can be in rolling-contact with the pump drive shaft 12, and a seal member 46*a* housed in the outside ring 46*b* such that it is located at the position of the roller 46*c* adjacent to an oil drain passage 59. In other words, the roller bearing 46 includes the outside ring 46*b* shaped like a substantial rectangle that is press-fitted into the inner circumference of the bearing hole 21*c*, the roller 46*c* rotatably housed in the outside ring 46*b*, and the seal member 46*a* housed in the outside ring 46*b* together with the roller 46*c*. The roller bearing 46 has no member corresponding to an inside ring and uses the outer circumference of the pump drive shaft 12 as an inside ring: The roller bearing 46 properly controls the leakage of lubricating oil (operating oil) from the outside ring 46*b* to hold the lubricating oil in the outside ring 46*b* appropriately and to thereby lubricate the roller 46*c* and its surroundings. This increases the lifetime and the reliability of the roller bearing 46.

The oil seal 47 placed between the pump drive shaft 12 and the bearing hole 21*c* oil-tightly seals the oil reservoir 57 (seals against the leakage of the oil) so that the operating oil, which is supplied to the roller bearing 46 through the clearance 56 between the outer circumference of the pump drive shaft 12 and the inner circumference of the bearing hole 21*c* and through an oil supply passage (not shown), does not leak in the converter housing 6 that houses the torque converter 3. The oil reservoir 57 is formed between the oil seal 47 and the roller bearing 46 and above the pump drive shaft 12. The oil-pump housing 21*a* has the oil drain passage 59 extending substantially upward (in the direction opposite to gravity) from the oil reservoir 57 and opened above the pump drive shaft 12. More specifically, the oil drain passage 59 is directed diagonally upward from the oil reservoir 57. The drain passage 59 extends from the substantial center of the oil-pump housing 21*a* along the axis of the pump drive shaft 12 above the pump drive shaft 12.

The oil drain passage 59 is provided to avoid the problems of increasing the pressure in the oil reservoir 57 by the sequential inflow of operating oil to cause the leakage of the operating oil in the space inside the converter housing 6 on the outside of the pump casing 21. Accordingly, the operating oil that lubricates the roller bearing 46 and is then stored in the oil reservoir 57 is discharged from a discharge opening 59*a* into the inner space of the multistage transmission mechanism 5, via the oil drain passage 59. The oil drain passage 59 extends substantially upward and is open at least above the central axis of the pump drive shaft 12. This structure prevents the problem that, for example, when the oil drain passage 59 is slanted downward, the oil in the torque converter flows out when a vehicle has not been used for a long time. This delays the response to the start of a vehicle until the torque converter is filled with oil at the start. The discharge opening 59*a* is arranged in the position of the pump casing 21 that substantially opposite to the position of a drum member 76 that supports inner brake plates 79 of the brake B-1. The drum member 76 will be described later.

The cover boss 20 extending in the axial direction is rotatably fitted on the inner circumference side of the pump drive shaft 12. On the inner circumference side of the cover boss 20, the input shaft 40 is rotatably supported through a bushing 49 acting as a bearing. The inner circumference of the cover boss 20 facing the outer circumference of the bushing 49 has, for example, a plurality of recessed grooves extending in an axial direction. The recessed grooves can direct the operating oil that flows from the multistage transmission mechanism 5 through an oil passage 50 and a clearance 51 into a space 52. Alternatively, the recessed grooves can be formed in the input shaft 40.

A spline 19*b* formed in the inner circumference of an inner race 19*a* of the one-way clutch 19 is in engagement with a spline 20*a* formed in the outer circumference of the cover boss 20, so that the relative rotation between the inner race 19*a* and the cover boss 20 is restricted. Furthermore, a clearance 53, which is connected to an oil passage 54, is formed between the inner circumference of the pump drive shaft 12 and the outer circumference of the cover boss 20. The clearance 51 serving as an oil passage is formed between the inner circumference of the cover boss 20 and the outer circumference of the input shaft 40. An oil hole 40*a* extending in the axial direction is formed at the center of the input shaft 40.

On the other hand, the thick race 41*a*, which is shaped like a flat ring for supporting rollers, is arranged between the thrust bearing 42 and the one-way clutch 19. A plurality of recessed grooves is formed in the outer surface of the one-way clutch 19 in contact with the thick race 41*a*. The thick race 41*b* shaped like a flat ring for supporting rollers is arranged between the thrust bearing 43 and the one-way clutch 19. A plurality of recessed grooves is formed also in the outer surface of the one-way clutch 19 in contact with the thick race 41*b*. The clearance and the recessed grooves of the thrust bearing 43 connect the clearance 51 and the space 52 with the inside of the torque converter 3 to form an oil passage for supplying operating oil into the torque converter 3. The clearance and the grooves of the thrust bearing 42 connect the clearance 53 and a space 55 with the inside of the torque converter 3 to form an oil passage for discharging (draining) operating oil from the torque converter 3.

On the other hand, the multistage transmission mechanism 5, which can vary the inputted rotation and output the rotation, includes, in the space of the mission case 7, the brake B-1, which serves as a friction engagement element capable of changing the engagement state for variable speeds based on the hydraulic pressure from the oil pump 45, and a hydraulic actuator 60 for connecting and disconnecting the brake B-1, which is a multiple-disc brake. The brake B-1 engages for 2-speed and 6-speed forward transmission. For example, when the multistage transmission mechanism 5 provides 6-speed forward and 1-speed reverse, and the brake B-1 connects and disconnects the power transmission between the input shaft 40 and an output shaft for outputting driving power that is transmitted from the internal-combustion engine to the input shaft 40 to driving wheels (not shown). Although the embodiment uses the brake B-1 as a friction engagement element, it is to be understood that it is not limited to that and a brake other than the brake B-1 may be used.

The pump casing 21 at the center of the mission case 7 and the converter housing 6 has the hydraulic actuator 60 at the position of the oil-pump housing 21*a* opposite to the brake B-1 and above the discharge opening 59*a*. The pump casing 21 has a cylinder section 62 for housing a piston member 61 of the actuator 60. The cylinder section 62 is shaped like a substantially ring-shaped recessed groove with the center on the input shaft 40. The piston member 61 has a substantially ring-like shape with the center on the input shaft 40 so as to be slidably inserted in the cylinder section 62.

The piston member 61 has a plurality of protrusions 61*a* projecting toward the mission case 7 at predetermined angle intervals. The piston member 61 is slidably inserted in the cylinder section 62, and an O-ring 63 is fitted in recessed grooves formed in the substantially ring-shaped outer circumference and inner circumference of the piston member 61. Thus, an inside cylinder chamber 65 is oil-tightly sealed.

A protrusion 66 is formed below the discharge opening 59*a* of the oil-pump cover 21*b* so as to protrude inside the mission case 7. The protrusion 66 holds the lower part of a retainer 67 for the piston member 61 with a bolt 69 screwed on the protrusion 66. The retainer 67 has the function of retaining the piston member 61 of the hydraulic actuator 60 and return springs 73 (refer to FIG. 2) for the piston member 61. The retainer 67 is integrated with a shield member (in other words, forms a shield member) according to the invention.

Referring to FIG. 2, the retainer 67 is fixed to the protrusions 66 and includes recesses 71 formed to make room for a plurality of rib-like protrusions 70. The rib-like protrusions 70 are arranged on the oil-pump cover 21b at substantially equal angle intervals and are fitted on the respective rib-like protrusions 70 with the bolts 69 fitted in respective fitting holes. The retainer 67 has a plurality of rectangular protruding holes 72 through which the protrusions 61a of the piston member 61 can slidably protrude. Between the piston member 61 and the retainer 67, the return springs 73 for biasing the piston member 61 in a returning direction in the cylinder section 62 are disposed, for example, four each between the protruding holes 72.

On the other hand, referring again to FIG. 1, a spline 7a is formed in the axial direction on the inner circumference of the mission case 7 opposite to the hydraulic actuator 60. Outer brake plates 75, e.g. seven, are in engagement with the spline 7a. At the radially inner part of the outer brake plates 75, the drum member 76 having a clutch and the like on the inside is rotatably supported with the center on the input shaft 40. The drum member 76 includes rib-like protrusions 77 on the inner circumference substantially at equal angle intervals. Furthermore, the drum member 76 includes a spline 76a formed in the axial direction on the outer circumference. Inner brake plates 79, e.g. six, are in engagement with the spline 76a. They are stopped from coming off with a snap ring 80 mounted at one end of the spline 7a, with the outer brake plates 75 and the inner brake plates 79 arranged alternately.

The operation of the automatic transmission 1 will now be described. When the vehicle is started, a lockup relay valve (not shown) of a valve body is in a draining state, and the operating oil in the cylinder chamber 28 is discharged through the oil passage 11d. In such a state, the piston member 29 is in the state shown in the drawing, and the lockup clutch 2 is released. In other words, the pressure section 29a of the piston member 29 releases the pressure between the clutch plates 25 and the clutch disc 26, and so both plates have no torque due to friction.

The torque from the engine crankshaft is transmitted through the front cover 9 and the rear cover 10 to the pump impeller 13 to rotate the turbine runner 15 through the flow of the operating oil with the rotation of the pump impeller 13 and the stator 16. Furthermore, the torque of the engine crankshaft is transmitted to the input shaft 40 through one of the driven plates 35 and the turbine hub 36, and is transmitted to driving wheels (not shown) through the multistage transmission mechanism 5.

At that time, the operating oil passes through the bushing 49 via the oil passage 50 and the clearance 51, and through the rollers of the thrust bearing 43 via the space 52. The operating oil is supplied to the inside of the torque converter 3 and the lockup clutch 2 and the damper 32. This prevents the operating oil from being heated to high temperature by circulating the operating oil acting as a power transmission medium between the pump impeller 13 and the turbine runner 15, and allows the operating oil to pass through the lockup clutch 2 and the coil spring 38 of the damper 32, thus lubricating them. Thereafter, the operating oil is circulated in the torque converter 3 such that it passes between the rollers of the thrust bearing 42, the space 55, the clearance 53, and the oil passage 54 and is drained toward an oil pan (not shown). The circulation route may be opposite in direction, with the thrust bearing 42 as the supply side and the thrust bearing 43 as the discharge side.

On the other hand, the torque from the engine crankshaft is transmitted from the rear cover 10 through the pump drive shaft 12 to the oil pump 45. At that time, the operating oil from the oil pump 45 is supplied to the roller bearing 46 and its surroundings between the inner circumference of the bearing hole 21c of the pump casing 21 and the outer circumference of the pump drive shaft 12 through a predetermined route and the clearance 56. The operating oil lubricates the roller bearing 46 and its surrounding slide-contact sections and is appropriately sealed by the seal member 46a housed on the inner circumference of the outside ring 46b with the roller 46c, leaks toward the oil reservoir 57 through the seal member 46a at appropriate times, and is sealed by the oil seal 47 to stay in the oil reservoir 57. At that time, the operating oil that is sequentially fed stays in the oil reservoir 57 to increase the hydraulic pressure in the oil reservoir 57. However, the hydraulic pressure is discharged from the oil drain passage 59 through the discharge opening 59a into the space in the multistage transmission mechanism 5, so that the hydraulic pressure in the oil reservoir 57 is maintained properly.

During the discharge, the operating oil discharged from the discharge opening 59a is discharged toward at least part of the multistage transmission mechanism 5, that is, the drum member 76 which rotates with the input shaft 40 and supports the inner brake plates 79 of the brake B-1. However, with the automatic transmission 1, since the retainer 67 is arranged to face the discharge opening 59a, this ensures the prevention of the spattering of the operating oil to the inner brake plates 79 and the drum member 76 with the retainer 67. The operating oil, which has been prevented from splattering, can be smoothly passed in the space inside the multistage transmission mechanism 5 through a clearance between the retainer 67 and the oil-pump cover 21b. The operating oil that has flowed into the inside space flows into the oil pan (not shown) with the operating oil that has lubricated the components of the automatic transmission 1.

In this way, the phenomenon of breather oil blow that has occurred in the conventional automatic transmissions can be reliably prevented. Moreover, according to the embodiment, the shielding member having the function of preventing the breather oil blow is integrated with the retainer 67 for retaining the return springs 73 for the piston member 61 of the hydraulic actuator 60. Therefore, there is no need to prepare a member dedicated to preventing the spattering of the operating oil from the discharge opening 59a Instead, merely arranging the retainer 67, which is already in position, provides shielding. This provides a compact structure without increasing the number of components.

For the conventional automatic transmissions, the slide-contact section between the outer circumference of the pump drive shaft 12 and the inner circumference of the bearing hole 21c has been supported by a bushing. On the other hand, the pump drive shaft 12 of the automatic transmission 1 is supported by the roller bearing 46. Therefore, a lot of operating oil can be discharged through the oil drain passage 59 via the clearance between a large number of the rollers 46c as compared with that using the bushing. Also, the roller bearing 46 leaks the operating oil toward the oil reservoir 57 efficiently, while holding a fixed amount of operating oil as lubricant with the seal member 46*a* integrated with the outside ring 46*b*.

When the vehicle has reached a relatively low fixed velocity, the lockup relay valve (not shown) is switched to a supply state. In this state, hydraulic pressure is applied to the cylinder chamber 28 through the oil passage 11*d* to move the piston 29*b* of the piston member 29; thus, the pressure section 29*a* pushes the clutch plates 25. This causes friction between the clutch plates 25 and the clutch disc 26, so that the lockup clutch 2 comes into a connection state in which a predetermined torque capacity can be held. In such a state, the torque of the engine crankshaft (not shown) is transmitted through the front cover 9 and the lockup clutch 2 to the damper 32, is transmitted to the driven plates 35 with the steep torque fluctuation due to the connection of the clutch and engine torque vibration being absorbed by the coil spring 38, and is then transmitted through the turbine hub 36 to the input shaft 40.

It is of course understood that departures can be made from the preferred embodiment of the invention by those of ordinary skill in the art without departing from the spirit and scope of the invention that is limited only by the following claims.

What is claimed is:

1. A transmission comprising:

a pump unit for applying hydraulic pressure;

a transmission mechanism capable of outputting inputted rotation in variable speed;

a pump casing for housing the pump unit, wherein the pump casing is integrated with a mission case for housing the transmission mechanism;

a pump drive shaft rotatably fitted in a bearing hole in the pump casing, wherein the pump drive shaft drives the pump unit;

a bearing member disposed between the pump drive shaft and the bearing hole;

a seal member disposed between the pump drive shaft and the bearing hole, wherein the seal member seals the leakage of oil; and an oil reservoir provided between the seal member and the bearing member;

wherein the pump casing is provided with an oil drain passage connecting the oil reservoir with the mission case; and wherein a shielding member is interposed between an opening of the oil drain passage to the mission case and at least part of the transmission mechanism to shield the at least part of the transmission mechanism, and wherein the shielding member is kept unrotatable against the mission case.

2. The transmission according to claim 1, wherein the transmission mechanism includes a frictional engagement element, and a hydraulic servo for connecting and disconnecting the frictional engagement element, wherein the hydraulic servo is in a position opposed to the frictional engagement element in the pump casing; and the shielding member is integrated with a retainer for retaining a piston member of the hydraulic servo and for retaining return springs for the piston member.

3. The transmission according to claim 2, wherein the oil drain passage extends substantially upward and is open above the pump drive shaft.

4. The transmission according to claim 2, wherein the bearing member comprises:

a race member in contact with the inner circumference of the bearing hole;

a roller housed in the race member so as to be rolling-contact with the pump drive shaft; and a seal member housed in the race member so as to be located at the end of the roller adjacent to the oil drain passage.

5. The transmission according to claim 2, wherein the pump casing is directly fixed to the mission case.

6. The transmission according to claim 1, wherein the oil drain passage extends substantially upward and is open above the pump drive shaft.

7. The transmission according to claim 6, wherein the bearing member comprises:

a race member in contact with the inner circumference of the bearing hole;

a roller housed in the race member so as to be rolling-contact with the pump drive shaft; and a seal member housed in the race member so as to be located at the end of the roller adjacent to the oil drain passage.

8. The transmission according to claim 6, wherein the pump casing is directly fixed to the mission case.

9. The transmission according to claim 1, wherein the bearing member comprises:

a race member in contact with the inner circumference of the bearing hole;

a roller housed in the race member so as to be rolling-contact with the pump drive shaft; and a seal member housed in the race member so as to be located at the end of the roller adjacent to the oil drain passage.

10. The transmission according to claim 9, wherein pump casing is directly fixed to the mission case.

11. The transmission according to claim 1, wherein the pump casing is directly fixed to the mission case.

12. The transmission according to claim 1, wherein the shielding member is fixed to the pump casing.

* * * * *